US008286127B2

(12) United States Patent
Bumgarner et al.

(10) Patent No.: US 8,286,127 B2
(45) Date of Patent: *Oct. 9, 2012

(54) MIRRORED FILE SYSTEM

(75) Inventors: William M. Bumgarner, San Jose, CA (US); Adam C. Swift, San Jose, CA (US); Andrew Gross, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 12/841,867

(22) Filed: Jul. 22, 2010

(65) Prior Publication Data

US 2010/0287526 A1   Nov. 11, 2010

Related U.S. Application Data

(63) Continuation of application No. 11/404,347, filed on Apr. 14, 2006, now Pat. No. 7,797,670.

(51) Int. Cl.
*G06F 9/44* (2006.01)

(52) U.S. Cl. ... 717/103; 717/120; 707/623; 707/999.01; 709/203; 718/106

(58) Field of Classification Search ......... None
See application file for complete search history.

(56) References Cited

U.S. PATENT DOCUMENTS

| | | | | |
|---|---|---|---|---|
| 6,578,068 | B1 * | 6/2003 | Bowman-Amuah | 709/203 |
| 6,675,261 | B2 | 1/2004 | Shandony | 711/121 |
| 6,804,719 | B1 * | 10/2004 | Cabrera et al. | 709/226 |
| 7,512,673 | B2 * | 3/2009 | Miloushev et al. | 709/221 |
| 7,634,491 | B2 * | 12/2009 | Cabrera et al. | 1/1 |
| 7,712,094 | B2 * | 5/2010 | Shapiro | 717/175 |
| 2002/0169742 | A1 * | 11/2002 | Nakamura et al. | 707/1 |
| 2002/0188605 | A1 * | 12/2002 | Adya et al. | 707/4 |
| 2003/0009753 | A1 * | 1/2003 | Brodersen et al. | 717/172 |
| 2003/0028509 | A1 * | 2/2003 | Sah et al. | 707/1 |
| 2003/0051236 | A1 * | 3/2003 | Pace et al. | 717/177 |
| 2004/0031030 | A1 * | 2/2004 | Kidder et al. | 717/172 |
| 2004/0064570 | A1 * | 4/2004 | Tock | 709/228 |
| 2004/0226013 | A1 * | 11/2004 | Mariotti et al. | 718/100 |
| 2007/0208748 | A1 * | 9/2007 | Li | 707/10 |

OTHER PUBLICATIONS

Title: Replicated directory service for weakly consistent distributed caches, author: Makpangou, M et al, source: IEEE, dated: 1999.*
Title: A generic reference software architecture for load balancing over mirrored Web servers: NaSr case study, author: Bashroush, R et al, source: IEEE, dated: 2005.*

* cited by examiner

*Primary Examiner* — Chameli Das
(74) *Attorney, Agent, or Firm* — Kilpatrick Townsend & Stockton LLP

(57) ABSTRACT

Mounting and populating a mirrored version of at least a portion of a file system of a recruiter machine at a volunteer machine performing one or more data processing tasks for the recruiter machine is disclosed. In some embodiments, an input stored in such a dedicated file system for the recruiter machine at the volunteer machine may be locally retrieved and reused, if still consistent with a corresponding input stored in a file system at the recruiter machine, when performing a data processing task for the recruiter machine at the volunteer machine. In some embodiments, if an input required by the volunteer machine to perform a data processing task for the recruiter machine is not cached in such a dedicated file system for the recruiter machine at the volunteer machine in a state that is consistent with a corresponding input stored in a file system at the recruiter machine, the input is obtained from the recruiter machine.

25 Claims, 9 Drawing Sheets

US 8,286,127 B2

MIRRORED FILE SYSTEM

CROSS REFERENCE TO OTHER APPLICATIONS

This application is a continuation of co-pending U.S. patent application Ser. No. 11/404,347, entitled MIRRORED FILE SYSTEM filed Apr. 14, 2006, which is incorporated herein by reference for all purposes.

BACKGROUND OF THE INVENTION

In typical approaches for distributing a build of a code base, source code files that are to be distributed for compilation are first pre-processed at the machine at which the associated code base is to be built to include all referenced files before being dispatched to recruited volunteer machines to be compiled. However, the pre-processing of source code files is typically both CPU and I/O intensive and, consequently, consumes significant processing resources at the machine building the code base. As a result, the number of volunteer machines to which such a machine is able to distribute processing is bounded by the speed with which the machine can pre-process the source code files that are to be distributed. Thus, although typical distributed build approaches yield some improvements in build speeds, the gains level-off as the available processing resources at the machine distributing needed compilation tasks become consumed by pre-processing the source code files that are to be distributed.

Other typical approaches for distributing a build of a code base at a machine include distributing pre-processing and/or compilation tasks to volunteer machines and installing and configuring a shared file system associated with the machine that is used by the volunteer machines when performing tasks for the machine. Traditional shared file systems are typically slow and inefficient when used by volunteer machines in such a configuration and also result in suboptimal parallel processing performance when used for distributing builds.

Thus, there is a need for an improved manner to distribute the processing associated with building a code base.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Mounting and populating a mirrored version of at least a portion of a file system of a recruiter machine at a volunteer machine performing one or more data processing tasks for the recruiter machine is disclosed. In some embodiments, an input stored in such a dedicated file system for the recruiter machine at the volunteer machine may be locally retrieved and reused, if still consistent with a corresponding input stored in a file system at the recruiter machine, when performing a data processing task for the recruiter machine at the volunteer machine. In some embodiments, if an input required by the volunteer machine to perform a data processing task for the recruiter machine is not cached in such a dedicated file system for the recruiter machine at the volunteer machine in a state that is consistent with a corresponding input stored in a file system at the recruiter machine, the input is obtained from the recruiter machine.

Figure 1:
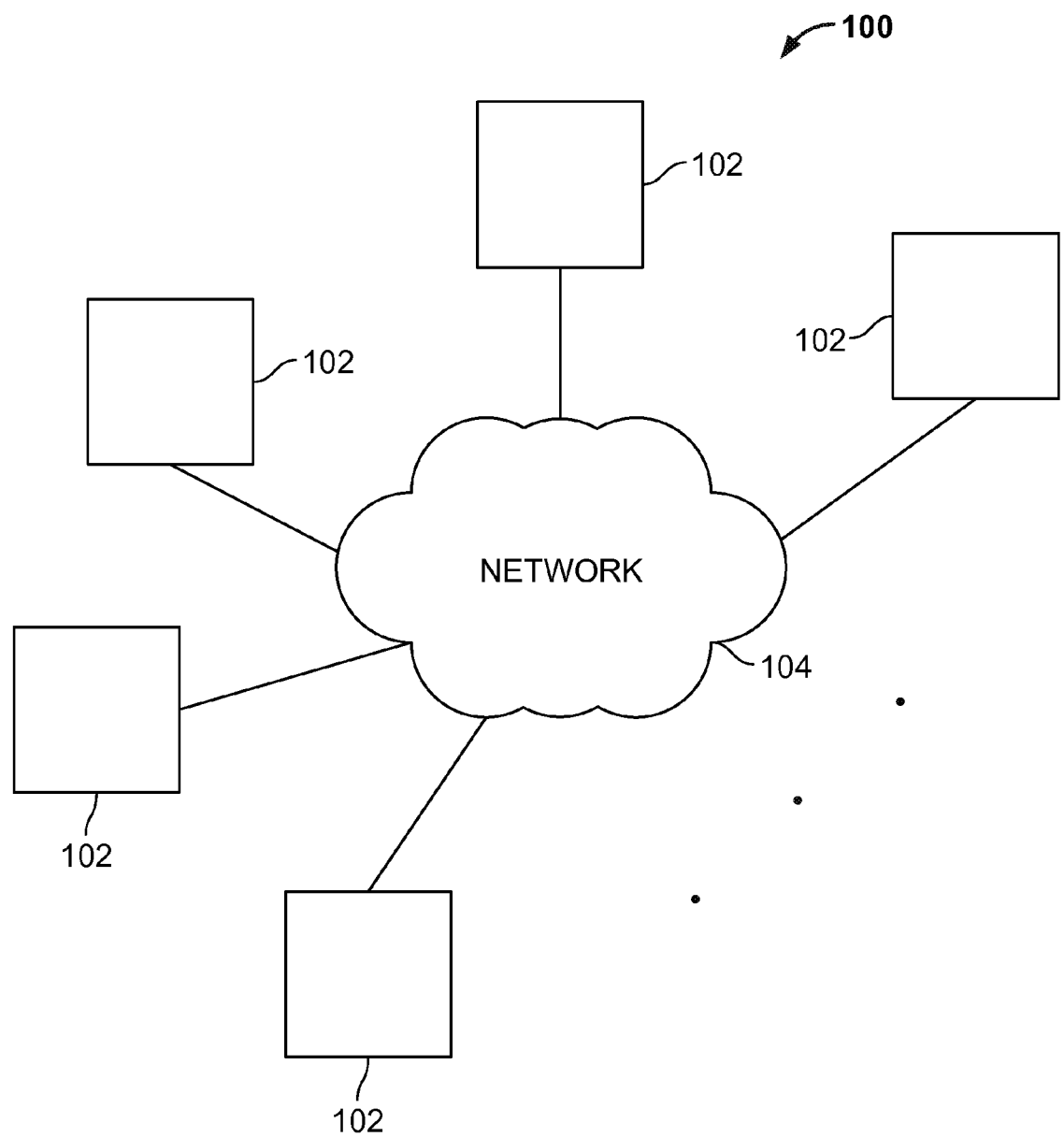
FIG. 1 illustrates an embodiment of a network environment in which a group of hosts, e.g., computers, are interconnected by a network.

FIG. 1 illustrates an embodiment of a network environment in which a group of hosts, e.g., computers, are interconnected by a network. As depicted, network environment 100 includes a plurality of machines 102 interconnected by a network 104. Network 104 may correspond to any private or public network, such as a LAN, WAN, the Internet, etc. In some embodiments, a group of local machines 102 are interconnected by a private, internal network 104. In some embodiments, one or more of the machines 102 may be remotely connected to an internal network 104, such as, for example, via a virtual private network. In some embodiments, network environment 100 corresponds to a software development environment in which a group of peer software development machines 102 are interconnected by a network 104.

When a computationally intensive data processing job needs to be performed at a machine, rather than performing the entire data processing job at that machine, it may be desirable to divide the data processing job into a plurality of independent tasks and to distribute at least some of these tasks to one or more other machines that are available in an associated network environment so that parallel processing may be employed to reduce the amount of time needed to complete the data processing job. In some embodiments, a machine that needs to perform a data processing job that can be broken down into a plurality of tasks recruits one or more volunteer machines to perform one or more of the tasks and supplies the volunteer machines with the data needed to perform the requested tasks if such data does not already exist at the volunteer machines so that performing the tasks at the volunteer machines does not introduce any local dependencies and the resulting outputs are the same as if the tasks had been performed at the recruiting machine.

With respect to network environment 100 of FIG. 1, for example, a recruiter machine in the group of machines 102 may distribute, via network 104, to one or more available volunteer machines in the group of machines 102 tasks associated with a data processing job that needs to performed at the recruiter machine. Upon obtaining by locally generating and/or by receiving from volunteer machines outputs for each of the tasks that comprise the data processing job, the recruiter machine combines and/or processes the outputs of the tasks to generate one or more outputs for the data processing job. Distributing some of the needed processing to other available machines results in improved speeds of completing the data processing job at the recruiter machine.

As sometimes used herein, the term "recruiter machine" refers to a machine that needs to perform a data processing job and that at least attempts to distribute one or more tasks that comprise the data processing job to one or more other available machines in an associated network environment, and the term "volunteer machine" refers to a machine that performs on behalf of a recruiter machine one or more tasks associated with a data processing job that needs to be completed at the recruiter machine.

Figure 2:
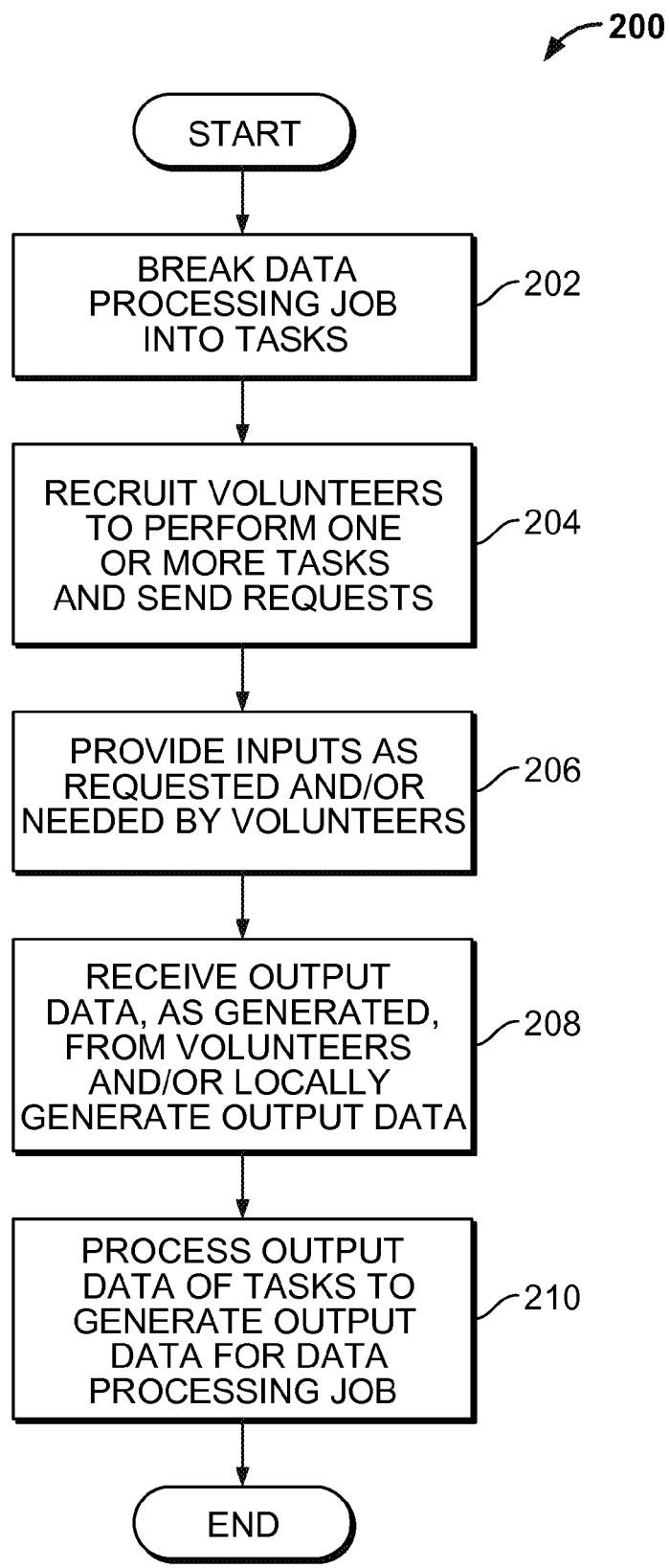
FIG. 2 illustrates an embodiment of a process for performing a data processing job.

FIG. 2 illustrates an embodiment of a process for performing a data processing job. In some embodiments, process 200 allows a recruiter machine to distribute to one or more volunteer machines at least some of the processing associated with a data processing job. As described in more detail below, in some embodiments, process 200 is employed to distribute source code pre-processing and/or compilation tasks to one or more volunteer machines during the build of a code base at a recruiter machine. Process 200 begins at 202 at which a data processing job is broken down into one or more tasks. At 204, one or more volunteer machines are recruited to perform one or more of the tasks determined at 202, and requests for the tasks are sent to the recruited volunteers. In some embodiments, load balancing considerations are taken into account when recruiting volunteer machines for tasks at 204. For example, volunteer machines that are busy with other processing may be requested to perform only a small number of tasks whereas more available volunteer machines may be requested to perform a larger number of tasks. The tasks that need to be performed that are not distributed to recruited volunteer machines at 204 are performed at the recruiter machine and continue being executed at the recruiter machine while it attempts to distribute other tasks to volunteer machines (e.g., at 204) and service requests from volunteer machines performing tasks (e.g., at 206). At 206, inputs are provided to the volunteer machines as requested and/or needed by the volunteer machines performing requested tasks. In the example of distributing source code pre-processing and/or compilation tasks to volunteer machines when building an associated code base at a recruiter machine, any input file that is associated with performing a requested compilation task, such as a source code file, a header or include file, a compiler binary, a file associated with compiler settings or flags, etc., may be provided to a volunteer machine at 206 when requested.

At 208, the output data resulting from performing the requested tasks are received from volunteer machines as they are generated at the volunteer machines and/or are locally generated, for example, for tasks that were not distributed to volunteer machines at 204. In some embodiments, a volunteer machine is unable to perform a requested task and/or supply the resulting output data to the recruiter machine that requested the task in a timely manner, for example, because the volunteer machine is busy with other higher-priority processing, because of compromised communication speeds due to excessive network traffic, etc. In such cases, the recruiter machine may request another volunteer machine to perform the task or may perform the task itself. A recruiter machine either locally performs or requests volunteer machines to perform tasks until output data for all of the tasks determined at 202 have been obtained. At 210, the output data associated with the tasks that comprise the data processing job are processed to generate output data for the data processing job, and process 200 ends. When one or more volunteer machines are available, it may be desirable to employ process 200 because in some embodiments it results in improvements in the speed of performing a data processing job at a recruiter machine since the recruiter machine is able to off-load at least some of the needed processing to available volunteer machines. In such cases, improvements in speed depend on the extent of parallel processing by the recruiter machine and the available volunteer machines. For the example of distributing the build of a code base by distributing source code pre-processing and/or compilation tasks to one or more volunteer machines, the output data resulting from compiling each source code file includes an object code file and any other associated compiler outputs such as diagnostic data (e.g., warnings, errors, etc.), an exit code (e.g., "0" for success, "1" for failure), etc.; and the output data of the build as a whole includes an executable file generated by linking together the object code files associated with the source code files that comprise the code base.

Figure 3:
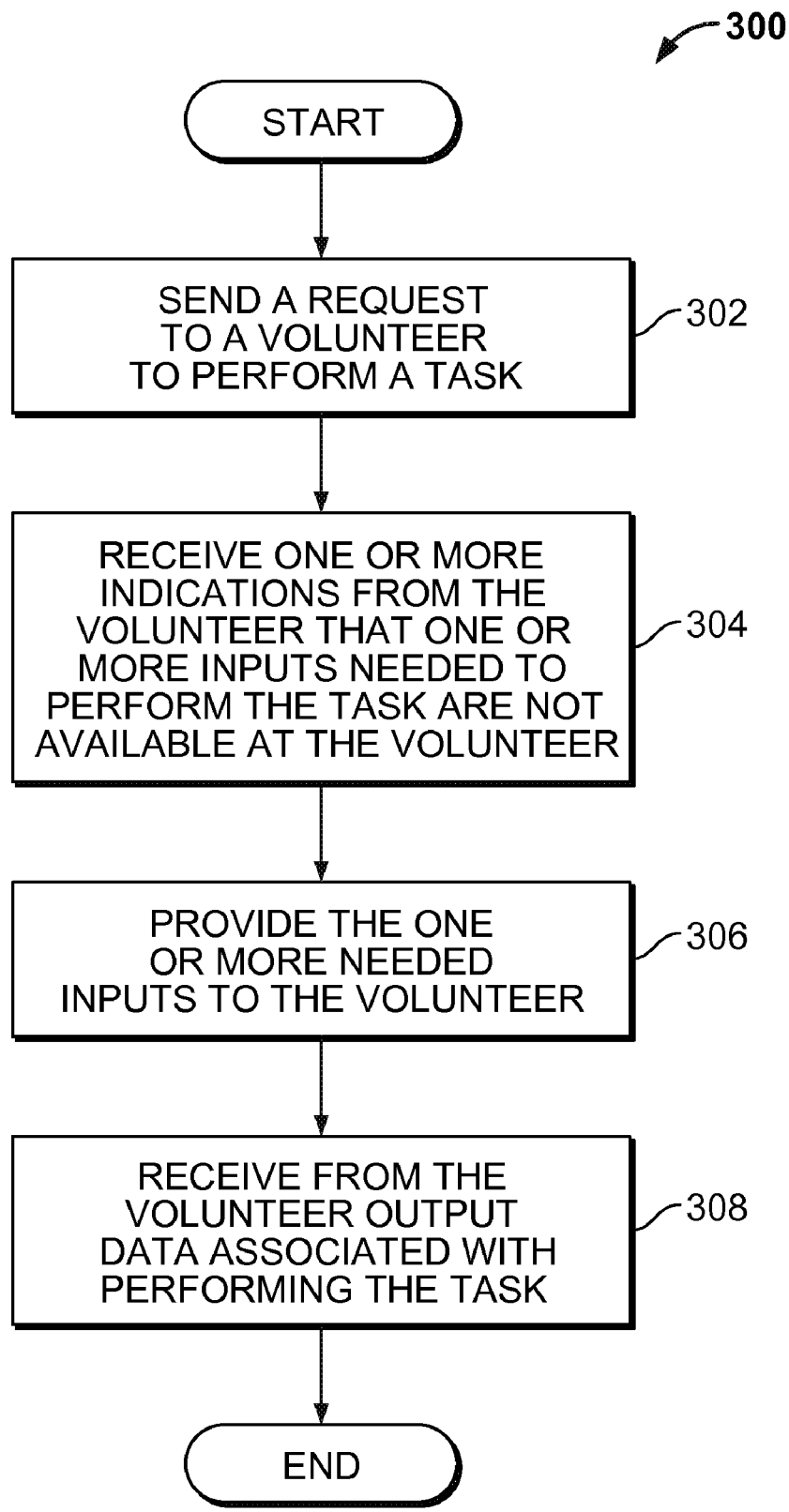
FIG. 3 illustrates an embodiment of a process for obtaining output data associated with a task.

FIG. 3 illustrates an embodiment of a process for obtaining output data associated with a task. In some embodiments, process 300 is employed by a recruiter machine to obtain output data associated with a task from a volunteer machine that performs the task on behalf of the recruiter machine. Process 300 begins at 302 at which a request to perform a task is sent to an available volunteer machine. The request of 302 may be directed, for example, to a port on the volunteer machine that is associated with a process configured to listen for such requests. In some embodiments, the request is sent to the volunteer machine at 302 upon receiving from the volunteer machine, in response to a query by the recruiter machine about the volunteer machine's availability, an indication that the volunteer machine is available. At 304, one or more indications are received from the volunteer machine that one or more inputs needed to perform the task are not available at the volunteer machine, for example, because the inputs do not already exist at the volunteer machine, because the states or versions of the inputs available at the volunteer machine are inconsistent with corresponding inputs at the recruiter machine, etc. In some embodiments, one or more indications of 304 are received via a list that specifies one or more needed inputs. In some embodiments, indications for one or more needed inputs are received individually or in groups as the corresponding needs arise at the volunteer machine during processing of the task. At 306, the one or more needed inputs are provided to the volunteer machine. In some embodiments, one or more needed inputs are provided to the volunteer machine at 306 as a group or bundle. In some embodiments, one or more needed inputs are provided to the volunteer machine at 306 as corresponding indications and requests are received from the volunteer machine at 304. At 308, the output data resulting from performing the task is received from the volunteer machine, and process 300 ends. In some embodiments, the task of process 300 includes pre-processing and/or compiling a source code file, and the output data includes an object code file and other associated compiler output data resulting from compiling the source code file.

Since the output data of a data processing task is expected to be the same regardless of whether the data processing task is performed at a recruiter machine or at a volunteer machine, a volunteer machine in some embodiments is configured to not introduce any local dependencies on the output data, for example, by employing versions of input data or files from its own local file system, when performing a requested data processing task for a recruiter machine. In some embodiments, all of the input data or files needed to perform a data processing task at a volunteer machine originate, either directly or indirectly, from the recruiter machine that requested the volunteer machine to perform the data processing task. Alternatively, in some embodiments, a volunteer machine determines whether a copy or version of a file needed during a data processing task for a recruiter machine is available within its own local file system so that the local version can be employed instead of having to request and receive the file from the recruiter machine. In such cases, such a determination can be made, for example by comparing the metadata and/or hash of the local version of the file with the metadata and/or hash of the corresponding file at the recruiter machine.

In some embodiments, a volunteer machine stores or caches input files received from or associated with a recruiter machine so that such files, if still valid and consistent in state with corresponding files at the recruiter machine, can be reused, if needed, during future data processing tasks performed by the volunteer machine for the recruiter machine. As described in more detail below, in some embodiments, a volunteer machine maintains a dedicated file system for the files associated with a recruiter machine that are cached at the volunteer machine. In some embodiments, the dedicated file system comprises a lazily updated partial view of at least a portion of a file system on the recruiter machine.

Figure 4:
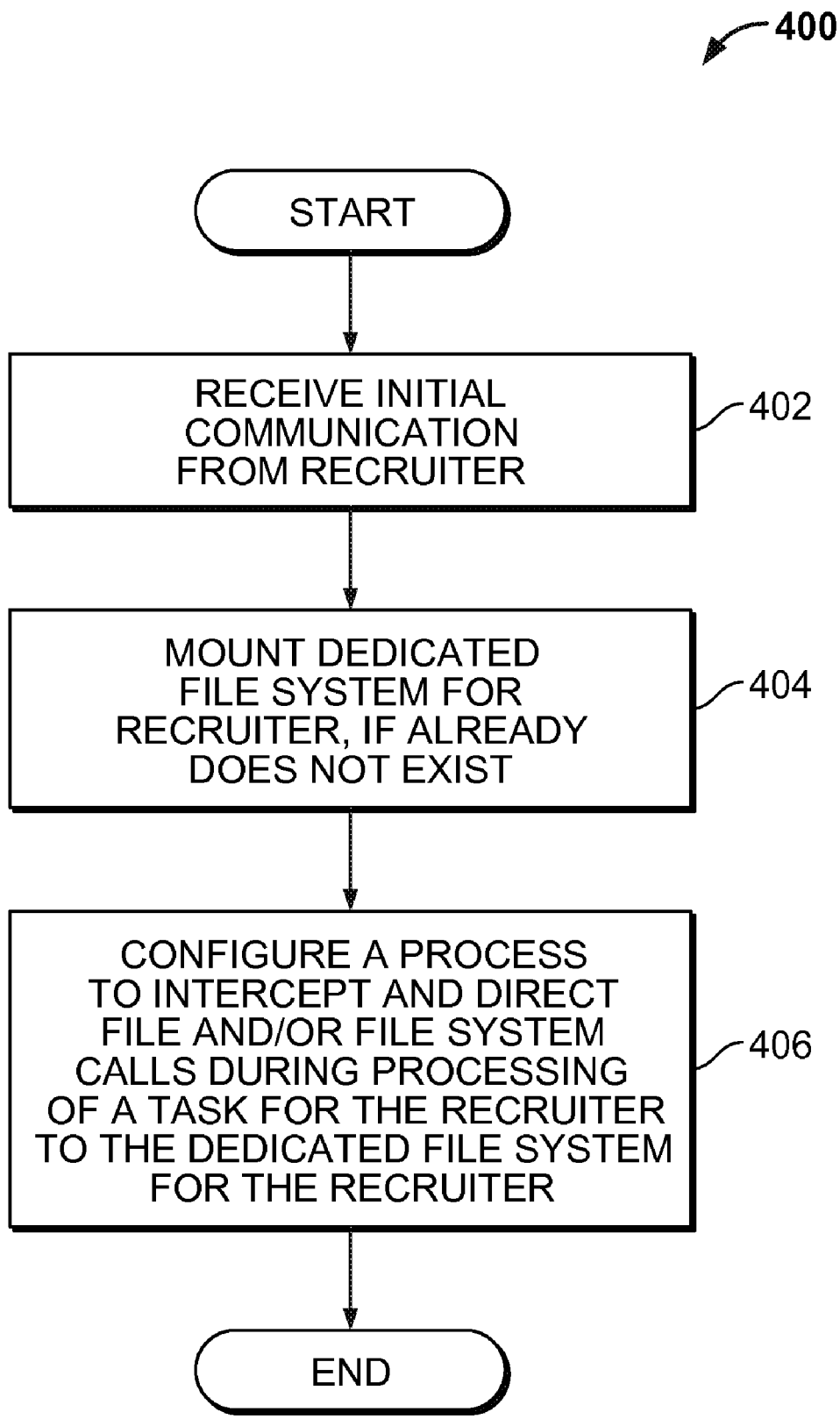
FIG. 4 illustrates an embodiment of a process for configuring a volunteer machine.

FIG. 4 illustrates an embodiment of a process for configuring a volunteer machine. In some embodiments, process 400 is employed to configure a volunteer machine to receive requests from and serve requests for a recruiter machine. Process 400 begins at 402 at which an initial communication is received from a recruiter machine. In some embodiments, the communication of 402 includes a connection being established between a recruiter machine and a volunteer machine. In some embodiments, 402 includes receiving a query from the recruiter machine regarding availability to perform one or more tasks and includes sending an acknowledgement of availability and/or the extent of availability. In some embodiments, the communication of 402 includes receiving requests to perform one or more tasks for the recruiter machine. At 404, a dedicated file system for the recruiter machine is mounted by the volunteer machine in its master file system space if such a dedicated file system does not already exist at the volunteer machine. In some embodiments, a dedicated NFS (Network File System) file system is mounted for the recruiter machine at 404. A dedicated file system for the recruiter machine may be mounted by the volunteer machine at 404, for example, the first time a new recruiter machine connects to the volunteer machine, the first time a new or known recruiter machine connects to the volunteer machine to request the volunteer machine to perform tasks associated with a new data processing job, the first time a previously served recruiter machine connects to the volunteer machine after the volunteer machine has dismounted a previously mounted dedicated file system for the recruiter and/or purged associated files due to, for example, lack of interaction between the two machines for at least a prescribed period of time, etc. At 406, a process is configured to intercept and direct file and/or file system calls (e.g., reads and/or writes) associated with processing a task for the recruiter machine to the dedicated file system for the recruiter machine at the volunteer machine. In some embodiments, the process configured at 406 comprises a kernel module or a local NFS server on the volunteer machine. Process 400 subsequently ends. In some embodiments, upon configuring a volunteer machine for a particular recruiter machine, such as using process 400, the volunteer is ready to run tasks for the recruiter machine.

Figure 5:
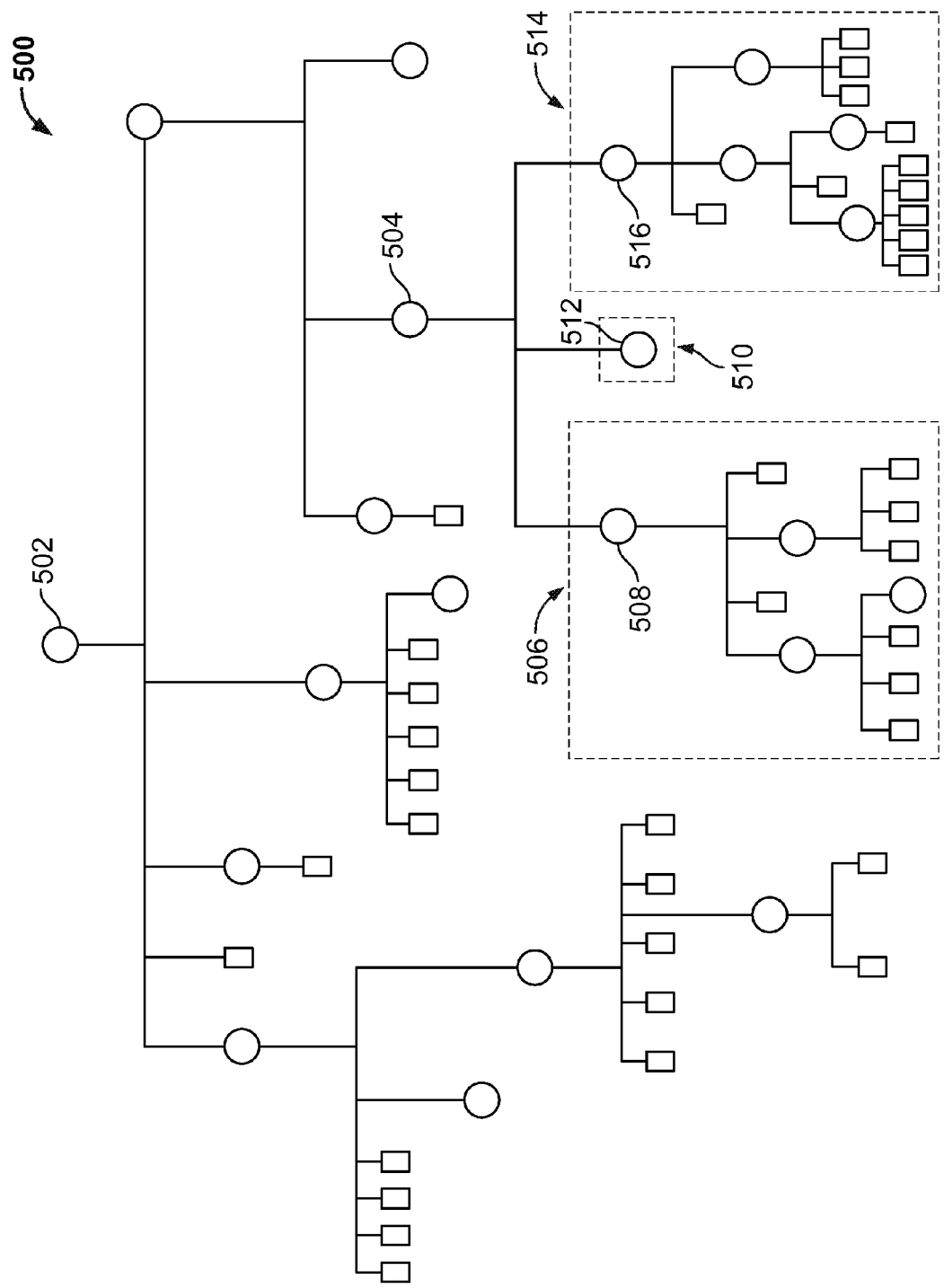
FIG. 5 illustrates an embodiment of a file system.

FIG. 5 illustrates an embodiment of a file system. In some embodiments, file system 500 corresponds to the master file system of a volunteer machine. In the given example, the circles represent directories, and the boxes represent files. In file system 500, 502 represents the root directory of a volunteer machine, and 504 represents a mount directory at the volunteer machine. In some embodiments, mount directory 504 is used as a mount point for dedicated file systems for one or more recruiter machines at the volunteer machine. In the given example, 506, 510, and 514 correspond to dedicated file systems for three different recruiter machines mounted at the volunteer machine. Mount points 508, 512, and 516 correspond to the root directories of the recruiter machines associated with dedicated file systems 506, 510, and 514, respectively.

A dedicated file system for a recruiter machine (e.g., 510 of FIG. 5) is initially empty when it is mounted at a volunteer machine for the first time. As the volunteer machine performs data processing tasks for a recruiter machine over time, the associated dedicated file system at the volunteer machine is gradually populated with files received from the recruiter machine, files generated for the recruiter machine by the volunteer machine while performing one or more requested tasks, and/or files retrieved from another local file system at the volunteer machine or another machine in an associated network. In the example of FIG. 5, dedicated file systems 506 and 514 have at least partially been populated with files associated with corresponding recruiter machines. In some embodiments, a dedicated file system for a recruiter machine at a volunteer machine corresponds to an at least partially mirrored view of the recruiter machine's file system. In some embodiments, such as in the example of FIG. 5, a volunteer machine includes dedicated file systems for multiple recruiter machines.

A dedicated file system for a recruiter machine at a volunteer machine may include files that the volunteer machine has received from the recruiter machine, generated for the recruiter machine, and/or obtained from a local file system or another machine within a prescribed period of time, over one or more connections, for tasks associated with one or more data processing jobs, etc. In some embodiments, the files cached at the volunteer machine are managed by their content hashes so that multiple copies of the same file are not stored in multiple locations at the volunteer machine, e.g., within a dedicated file system for a particular recruiter machine, across one or more file systems, etc. In various embodiments, a file included in a dedicated file system for a recruiter machine at a volunteer machine may be purged if it has not been used by the volunteer machine within a prescribed period of time, may be purged once a connection between the recruiter machine and the volunteer machine is terminated after the completion of one or more data processing tasks, may be marked as invalid if notification is received at the volunteer machine from the recruiter machine that a corresponding file at the recruiter machine has been updated, may be replaced with an updated version of the file from the recruiter machine, etc. In some embodiments, a dedicated file system for a recruiter machine at a volunteer machine is dismounted and/or purged, for example, upon the completion of one or more tasks for the recruiter machine by the volunteer machine, upon the termination of a connection between the volunteer machine and the recruiter machine, upon lack of interaction between the two machines for at least a prescribed period of time, etc.

In some embodiments, a dedicated file system for a recruiter machine at a volunteer machine is mounted in a system area of the volunteer machine that is opaque to the users of the volunteer machine so that the associated files can not be accessed and/or altered by such users. When performing a data processing task for a particular recruiter machine, data or files needed during the data processing task are in some embodiments either requested directly from that particular recruiter machine or are retrieved, if available and still valid, from the dedicated file system for that particular recruiter machine. In some embodiments, a volunteer machine is configured to ensure that any file needed at the volunteer machine during a data processing task for a recruiter machine originates from the recruiter machine and/or is identical to a corresponding file at the recruiter machine. The dedicated file system for a recruiter machine facilitates the segregation of files associated with that recruiter machine from any other source, such as the volunteer machine or another recruiter machine so that only files associated with that recruiter machine are potentially reused when performing tasks at the volunteer machine for that recruiter machine.

Figure 6:
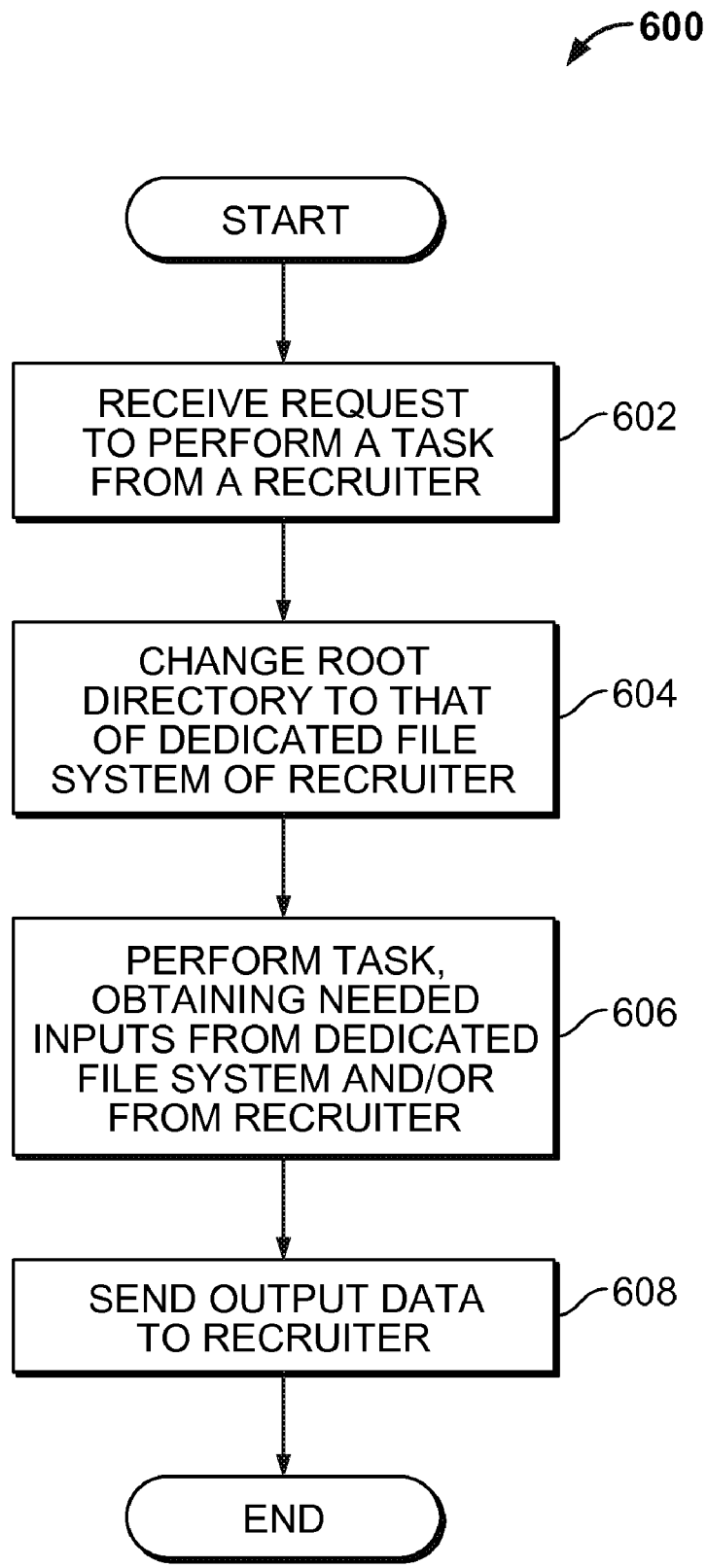
FIG. 6 illustrates an embodiment of process for performing a task.

FIG. 6 illustrates an embodiment of process for performing a task. In some embodiments, process 600 is employed by a volunteer machine to perform a task for a recruiter machine. Process 600 begins at 602 at which a request to perform a task is received from a recruiter machine. The request of 602 may be received, for example, on a port on the volunteer machine that is configured to listen for requests from recruiters. At 604, the root directory is changed to correspond to the mount point or root directory of the dedicated file system for the recruiter machine so that the processing of the task is performed with respect to that file system, which represents at least a partially synchronized local view of at least a portion of a file system at the recruiter machine. At 606, the task is performed with needed input files being locally retrieved from the dedicated file system or received from the recruiter machine during processing. In some embodiments, files received from the recruiter machine at 606 are locally cached in the dedicated file system and/or replace older versions of the files in the dedicated file system. At 608, the output data associated with performing the task is sent to the recruiter machine, and process 600 subsequently ends. In some embodiments, the output data of 608 is locally cached in the dedicated file system. In some embodiments, only output data that needs to be committed back to the recruiter machine is sent to the recruiter machine at 608. In such cases, other output data, such as intermediary data generated during processing the task or other tasks associated with the task, may be locally cached in the dedicated file system but not sent to the recruiter machine. In some embodiments, not only the output data associated with performing the task but any changes in the dedicated file system for the recruiter machine made at the volunteer machine by any process are sent back to the recruiter machine. In some embodiments, process 600 is employed by a volunteer machine to perform a plurality of tasks in response to receiving a request to perform a plurality of tasks at 602. In some embodiments, the task of process 600 includes pre-processing and/or compiling a source code file, and the output data includes an object code file and other associated compiler output data resulting from compiling the source code file.

In some embodiments, a volunteer machine is configured to ensure that a file retrieved from a dedicated file system for a recruiter machine at the volunteer machine (or, in some embodiments, from a local file system or another machine) during processing of a task for the recruiter machine is the same as the corresponding file at the recruiter machine. In some embodiments, the validity of a locally cached file in a dedicated file system at the volunteer machine is confirmed with the associated recruiter machine prior to using it while performing a task for the recruiter machine. In some embodiments, data or metadata such as path, size, modification date and time, content hash, etc., of the versions of the file at the volunteer machine and the recruiter machine, respectively, are compared to determine if the files match. In some embodiments, a hash function is applied to the contents of the version of the file at the volunteer machine and to the contents of the version of the file at the recruiter machine, and the resulting hash values are compared to determine if they, and thus the files, match. If the files still match, the local version of the file at the volunteer machine can be used. If the files do not match, the newer or updated version of the file needs to be obtained from the recruiter machine.

In some embodiments, a recruiter machine maintains a record of the volunteer machines to which each file at the recruiter machine has been provided so that when a file is updated at the recruiter machine a notification of the update and/or the updated version of the file can be communicated to the affected volunteer machines. In some embodiments, each file is identified at the recruiter machine by its file handle, so that different versions of the file can be distinguished. In such cases, a recruiter machine may maintain, for example, a record of each file handle and the volunteer machines to which the file associated with that file handle has been provided. In some embodiments, a recruiter machine stores or caches multiple versions of files. In some embodiments, records are kept of the dates and times files are updated at a recruiter machine. The dates and times of updates of a file may be useful, for example, when a validity check of a file cached at a volunteer machine is conducted so that the locally cached copy of the file at the volunteer machine is compared with the version of the file that was current at the recruiter machine at the date and time the data processing job associated with the task for which the file is needed was commenced at the recruiter machine. In some embodiments, files and/or directories in the dedicated file system for the recruiter machine at the volunteer machine are mounted with their "no access time" flags set so that their access times are not updated when accessed, either by reading or writing, at the volunteer machine but reflect the times at which they were received from the recruiter machine.

In some embodiments, a notification of files that have been previously provided to a volunteer machine by a recruiter machine and that have been subsequently updated at the recruiter machine is communicated to the volunteer machine each time the volunteer machine is requested to perform a new task and/or a task associated with a new data processing job. In some embodiments, a notification of files that have been previously provided to a volunteer machine by a recruiter machine and that have been subsequently updated at the recruiter machine is automatically sent by the recruiter machine to the volunteer machine after a prescribed timeout. In some embodiments, the notification is in the form of a list. In some embodiments, upon receiving a notification of updated files at a recruiter machine, corresponding files that are locally cached at the volunteer machine are marked as invalid so that they are not subsequently used when processing tasks for the recruiter machine. In some embodiments, a corresponding updated file for an invalidated file is only requested by the volunteer machine when that file is needed so that resources are not unnecessarily expended in acquiring updates to files that may never be used. In some embodiments, files marked as invalid at a volunteer machine are periodically purged.

Figure 7:
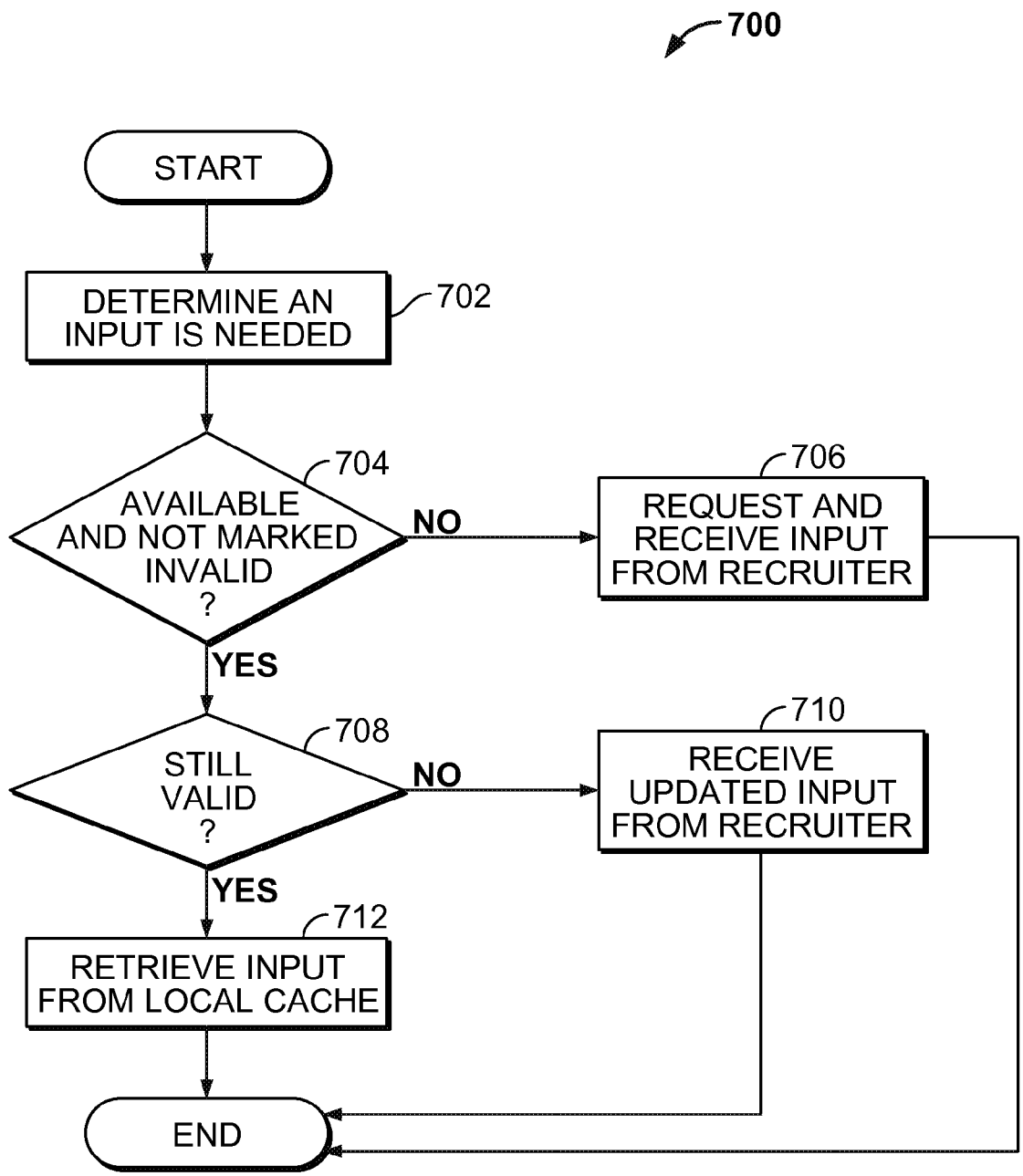
FIG. 7 illustrates an embodiment of a process for obtaining an input.

FIG. 7 illustrates an embodiment of a process for obtaining an input. In some embodiments, process 700 is employed by a volunteer machine to obtain a needed input file while performing a task for a recruiter machine. In some embodiments, process 700 is employed at 606 of FIG. 6 to obtain one or more needed inputs. Process 700 begins at 702 at which it is determined that an input is needed. It is determined at 704 whether the needed input is locally available and not marked invalid. If it is determined at 704 that the needed input is not locally available or if it is determined at 704 that the needed input is locally available but is marked invalid, the needed input is requested and/or received from the recruiter machine at 706, and process 700 ends. In some embodiments, the input received from the recruiter machine at 706 is cached in the dedicated file system for the recruiter machine at the volunteer machine. If it is determined at 704 that the needed input is locally available and has not been marked invalid, it is determined at 708 whether the locally cached version of the input is still valid by determining whether it matches the corresponding version of the input at the recruiter machine. In some embodiments, one or more parameters of the input such as its path, size, date and time of modification, etc., are compared with the parameters of the corresponding input at the recruiter machine at 708 to determine if the two inputs match. In some embodiments, hash values of the contents of the inputs at the volunteer machine and recruiter machine are computed and compared at 708 to determine if the inputs match. In some embodiments, at 708 the locally cached version of the input is compared with the version of the input at the recruiter machine that was current when the data processing job associated with the task for which the input is needed was started at the recruiter machine when determining if the two versions match. If it is determined at 708 that the locally cached version of the needed input is not valid, an updated version of the input is requested and/or received from the recruiter machine at 710, and process 700 ends. In some embodiments, based upon the determination at 708 that a locally cached version of a needed input is not valid, the updated version of the input is automatically received from the recruiter machine at 710 without being requested (e.g., during a read) by the volunteer machine. In some embodiments, the updated version of the input received from the recruiter machine at 710 replaces the old version of the input in the dedicated file system for the recruiter machine at the volunteer machine. If it is determined at 708 that the locally cached version of the input is still valid, the input is retrieved from local cache or storage at 712, and process 700 ends. Process 700 is repeated by a volunteer machine until all needed inputs have been obtained prior to performing an associated task or as inputs are needed while performing an associated task. In the example of pre-processing and/or compiling a source code file at a volunteer machine, process 700 is employed in some embodiments to obtain inputs such as the source code file to be compiled, any header or include files referenced by the source code file, the compiler binary, other compiler settings such as flags, etc.

Figure 8:
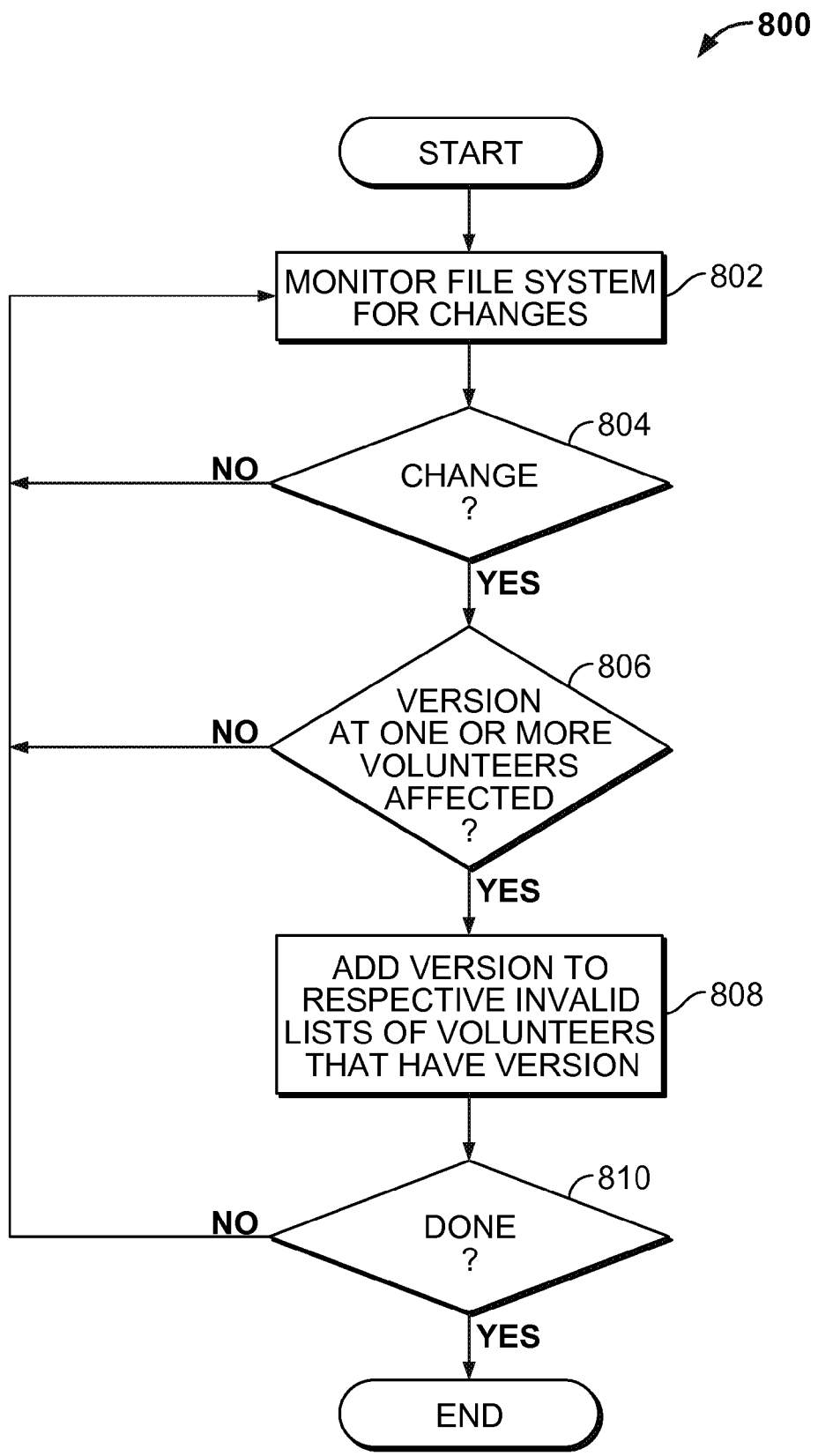
FIG. 8 illustrates an embodiment of a process for noting changes to files.

FIG. 8 illustrates an embodiment of a process for noting changes to files. In some embodiments, process 800 is employed by a recruiter machine to monitor and note changes in its file system. Process 800 begins at 802 at which a file system is monitored for changes. A change may result in a file system, for example, from updating a file, adding a file to the file system, deleting a file from the file system, moving a file to a different directory, etc. At 804 it is determined if a change has occurred. If it is determined at 804 that a change has not occurred, process 800 returns to 802 at which the file system is continued to be monitored for changes. If it is determined at 804 that a change has occurred in the file system, it is determined at 806 whether the change affects a version of a file at one or more volunteer machines. If it is determined at 806 that the change does not affect any files at any volunteer machines, process 800 returns to 802 at which the file system is continued to be monitored for changes. If it is determined at 806 that the change affects the version of a file at one or more volunteer machines, the affected file is added to the respective invalid list of each volunteer machine that has the affected file at 808. At 810, it is determined whether to continue monitoring the file system for changes. If it is determined at 810 to continue monitoring the file system for changes, process 800 returns to 802 at which the file system is continued to be monitored for changes. If it is determined at 810 not to continue monitoring the file system for changes, process 800 ends. In some embodiments, it is determined not to continue monitoring the file system for changes at 810 and to end process 800 if no volunteer machines are performing tasks for an associated recruiter machine.

Figure 9:
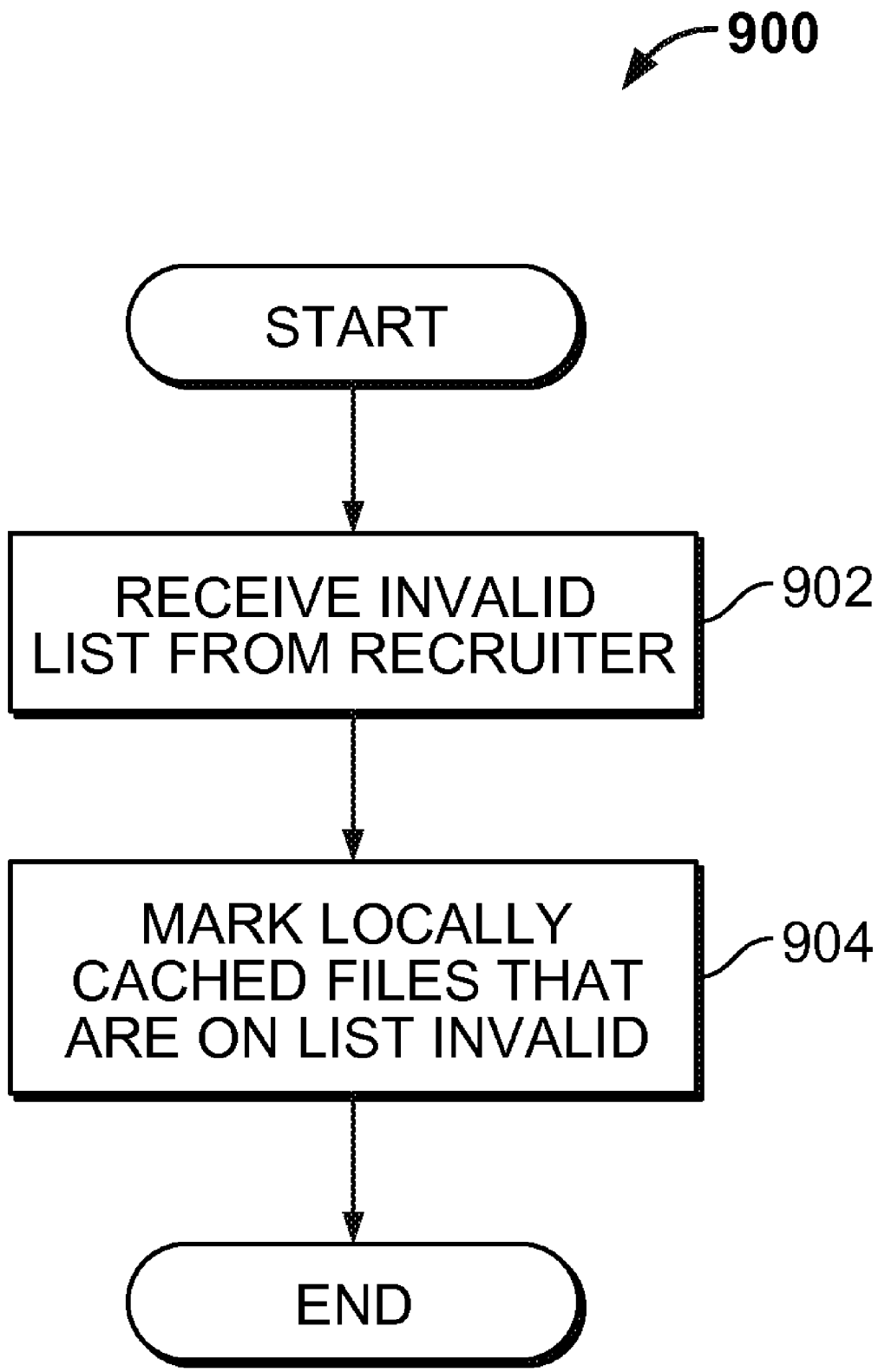
FIG. 9 illustrates an embodiment of a process for marking obsolete versions of files invalid.

FIG. 9 illustrates an embodiment of a process for marking obsolete versions of files invalid. In some embodiments, process 900 is employed by a volunteer machine. Process 900 begins at 902 at which an invalid list is received from a recruiter machine. In some embodiments, an invalid list is received from a recruiter machine each time the recruiter machine requests a volunteer machine to perform a task and/or a task for a new data processing job. At 904, locally cached files that are on the list received at 902 are marked invalid, and process 900 ends. In some embodiments, the files marked invalid at a machine are periodically purged.

Any data processing job that can be broken down into one or more distributable tasks can be performed with the techniques described herein. Building a code base is one example of a data processing job that may need to be performed at a machine. In such a case, it may be desirable to distribute at least some of the processing associated with building the code base at a machine to one or more volunteer machines, such as one or more available peer machines in an associated software development environment. The code base of a software product or project typically includes a large number of source code files. During a build of the software, each of the source code files that comprise the code base is compiled into an object code file, and the resulting object code files are subsequently linked to generate an executable file. During software development, the code base of the software product or project being developed may need to be built at a machine multiple times, for example, to test modifications made to one or more source code files. However, the software development process at a machine is often limited by build speeds, especially when an associated code base is complex and includes a large number of source code files. For example, a code base that includes thousands of source code files may take several hours to build at a single machine. In order to accelerate the build process, a machine building a code base may distribute at least some of source code file compilations that need to be performed to build the code base to one or more volunteer machines that are available in an associated network environment.

A source code file included in a code base typically references one or more input files such as header files, each of which may reference other inputs and/or header files, which, in turn, may reference other inputs and/or header files, and so on. Many of the input files referenced by a source code file of a code base are available from a software development kit associated with the code base. If a source code file includes references to any input files, prior to being run through a compiler, the source code file is pre-processed to recursively include the content of each referenced input file in the code of the source code file.

In some embodiments, build speeds may at least in part be improved by distributing source code pre-processing and compilation tasks to one or more recruited volunteer machines. In some embodiments, distributing associated pre-processing tasks along with compilation tasks to volunteer machines allows a recruiter machine to dedicate more of its bandwidth to the distribution of tasks, which in many cases results in enhanced parallel processing as more tasks are distributed and/or more volunteer machines are recruited. When performing a requested pre-processing and/or compilation task, the volunteer machine may directly request one or more needed input files from the recruiter machine for which it is performing the task and/or retrieve one or more needed input files, if available and still valid, from at least a partially mirrored version of the file system of the recruiter machine that it locally maintains and that is populated with files received from and associated with the recruiter machine. Since the source code files of a code base often reference many of the same input files, once the mirrored version of the recruiter machine's file system is adequately populated at a volunteer machine, many of the input files needed for the pre-processing and/or compilation task can be retrieved from a local location and need not be repeatedly obtained from the recruiter machine. Any file associated with a recruiter machine may be locally stored at a volunteer machine in a dedicated file system for the recruiter machine at the volunteer machine analogously to the manner in which a corresponding file is stored and hierarchically arranged at the recruiter machine. Files stored in such a dedicated file system for a recruiter machine at a volunteer machine may include, for example, source code files, header or include files, the compiler binary, files associate with compiler options, object code files generated for the recruiter machine at the volunteer machine, etc.

In some embodiments, the storing or caching at a volunteer machine of files associated with a recruiter machine, using a file system on the volunteer machine that is dedicated to storing files associated with the recruiter machine, facilitates the efficient pre-processing of a source code file at a volunteer machine. In some embodiments, when a recruiter machine initially requests one or more volunteer machines to perform compilation tasks, it may have to provide many of the needed input files to the volunteer machines. However, as the volunteer machines perform compilations for the recruiter machine and as a result as their local dedicated file systems for the recruiter machine become increasingly populated, the messaging and data exchange between the recruiter machine and the volunteer machines is quickly reduced. In some embodiments, consistent hashing techniques may be employed in an associated network environment to transfer files associated with a particular recruiter machine between one or more volunteer machines so that the burden on the recruiter machine to directly provide all the files needed by the volunteer machines can be reduced.

In some embodiments, the form of a request to perform a task to a volunteer machine is the same as or is similar to the form of the command for running the task at a recruiter machine. For example, in some embodiments the form of a request to a volunteer machine from a recruiter machine for a specific pre-processing and/or compilation task is similar to the form of a corresponding compiler command that would be entered at the recruiter machine to run the task. In some embodiments, an interface for a tool associated with distributing the processing associated with performing a data processing job at a recruiter machine makes the manner in which the processing of the job is accomplished transparent to a user. For example, an interface for a distributed build tool in some embodiments makes the underlying build process transparent to a user, and the user enters a command into the interface in the same way as for a compiler. Transparently to the user, the command is executed and associated processing performed either locally, by one or more recruited volunteer machines, or a combination of both. The user only sees the resulting final output as made available at the recruiter machine.

In some embodiments, the hash of a command associated with running a task is mapped to the input files needed to perform the task and stored so that when the same command is encountered in the future, the needed inputs files can be looked up and pushed to a volunteer machine with a request to execute the command, eliminating the need, in some embodiments, for a volunteer machine to mount and maintain a dedicated file system for the recruiter machine. For example, a hash of a compiler command line may be mapped to the input files needed in performing an associated compilation and stored, for example, in a database. When the same compiler command line hash value is encountered in the future, the needed inputs files are looked up in the database and if available supplied to a volunteer machine with the request to compile, eliminating the need, in some cases, for a volunteer machine to mount and maintain a dedicated file system for the recruiter machine.

In some embodiments, a volunteer machine performs a dummy or bogus run on a task (e.g., a compilation) so that an associated recruiter machine can be made aware of the needed inputs and can supply or push the needed inputs to the volunteer machine, e.g., so the volunteer machine will already have the input at a later run time.

In some embodiments, recording the changes made to the file system of a recruiter machine and storing one or more versions of files at the recruiter machine are used to implement an "undo"-enabled system, which allows a user to undo system calls or commands that altered the file system. Such a feature may be useful, for example, during debugging.

In some embodiments, dedicated file systems for a recruiter machine are mounted and maintained on a select group of one or more high-powered volunteer machines that have sufficient processing resources to pre-process source code files received for pre-processing and compilation from the recruiter machine and to distribute at least some of the pre-processed source code files to other volunteer machines for compilations.

Another example of a data processing job includes encoding and/or compressing a video or other large file at a machine in order to, for example, burn the encoded and/or compressed file onto a DVD or transmit it over a network, wireless network, or other communication path. Such a data processing job can be broken down into tasks associated with different offsets of the file, and one or more of these tasks can be distributed to one or more volunteer machines. The outputs received from the volunteer machines that performed the requested encodings and/or compressions at the designated offsets for the recruiter machine can subsequently be merged back together at the recruiter machine to obtain the desired output.

The techniques disclosed herein are not limited to any of the given examples but may be used for any data processing job that can be broken down into one or more tasks, at least some of which are performed by one or more recruited volunteer machines. In some embodiments, a dedicated file system for a recruiter machine is mounted and maintained at each volunteer machine. The dedicated file system locally provides at least a partial view of the file system at the recruiter machine and may be used to cache files associated with the recruiter machine so that one or more files needed to perform a requested task at a volunteer machine can be locally retrieved from the dedicated file system and reused if still valid.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for accomplishing a data processing task to obtain output data, comprising:
    receiving at a recruiter machine an indication that an input that is used by a volunteer machine to perform a data processing task on behalf of the recruiter machine is not cached in a state that is consistent with a corresponding input stored in a file system at the recruiter machine, wherein cached input is cached in a dedicated file system associated with the recruiter machine at the volunteer machine, and wherein the dedicated file system comprises at least partially mirrored view of the recruiter machine's file system, and wherein the dedicated file system is mounted under a mount directory of a master file system at the volunteer machine, and wherein the recruiter machine distributed the data processing task to the volunteer machine, and wherein the data processing task is associated with uncompiled code; and
    providing the input to the volunteer machine in a state that is consistent with the corresponding input at the recruiter machine.

2. The method as recited in claim 1, wherein receiving at a recruiter machine an indication that an input that is used by a volunteer machine to perform a data processing task on behalf of the recruiter machine is not cached in a state that is consistent with a corresponding input stored in a file system at the recruiter machine comprises receiving a request for the input from the volunteer machine.

3. The method as recited in claim 1, wherein receiving at a recruiter machine an indication that an input that is used by a volunteer machine to perform a data processing task on behalf of the recruiter machine is not cached in a state that is consistent with a corresponding input stored in a file system at the recruiter machine includes determining that one or more parameters associated with a version of the input as cached in the dedicated file system associated with the recruiter machine at the volunteer machine are not consistent with one or more corresponding parameters of the corresponding input as stored in a file system at the recruiter machine.

4. The method as recited in claim 1, wherein receiving at a recruiter machine an indication that an input that is used by a volunteer machine to perform a data processing task on behalf of the recruiter machine is not cached in a state that is consistent with a corresponding input stored in a file system at the recruiter machine includes determining that a hash of a version of the input as cached in the dedicated file system associated with the recruiter machine at the volunteer machine is not consistent with a hash of the corresponding input as stored in a file system at the recruiter machine.

5. The method as recited in claim 1, further comprising sending from the recruiter machine to the volunteer machine a request to perform the data processing task.

6. The method as recited in claim 1, wherein the data processing task is part of a set of tasks that comprise a data processing job that is performed at the recruiter machine.

7. The method of claim 1, wherein a state other than the consistent state comprises the input not existing in the dedicated file system associated with the recruiter machine at the volunteer machine.

8. The method of claim 1, wherein a state other than the consistent state comprises the version of the input cached in the dedicated system associated with the recruiter machine at the volunteer machine being marked invalid.

9. The method of claim 1, wherein one or more other dedicated file systems associated with other recruiter machines are mounted under the mount directory of the master file system at the volunteer machine.

10. A method for performing a data processing task, comprising:
    determining at a volunteer machine that an input that is used by the volunteer machine to perform a data processing task on behalf of a recruiter machine is not cached in a state that is consistent with a corresponding input stored in a file system at the recruiter machine, wherein cached input is cached in a dedicated file system associated with the recruiter machine at the volunteer machine, and wherein the dedicated file system comprises at least partially mirrored view of the recruiter machine's file system, and wherein the dedicated file system is mounted under a mount directory of a master file system at the volunteer machine, and wherein the recruiter machine distributed the data processing task to the volunteer machine, and the data processing task is associated with uncompiled code; and
    obtaining the input from the recruiter machine in a state that is consistent with the corresponding input at the recruiter machine.

11. The method as recited in claim 7, further comprising receiving from the recruiter machine a request to perform the data processing task.

12. The method as recited in claim 11, wherein receiving the request includes configuring at the volunteer machine in response to the request a process to intercept and direct file system calls associated with the data processing task to the dedicated file system.

13. The method as recited in claim 10, wherein determining at a volunteer machine that an input that is used by the volunteer machine to perform a data processing task on behalf of a recruiter machine is not cached in a state that is consistent with a corresponding input stored in a file system at the recruiter machine includes determining that the input does not exist in the dedicated file system associated with the recruiter machine at the volunteer machine.

14. The method as recited in claim 10, wherein determining at a volunteer machine that an input that is used by the volunteer machine to perform a data processing task on behalf of a recruiter machine is not cached in a state that is consistent with a corresponding input stored in a file system at the recruiter machine includes determining that a version of the input cached in the dedicated file system associated with the recruiter machine at the volunteer machine is marked invalid.

15. The method as recited in claim 10, further comprising receiving from the recruiter machine an invalid list that includes files that have been previously provided to the volunteer machine but have since been updated at the recruiter machine and are no longer valid at the volunteer machine.

16. A system for performing a data processing task, comprising:
a processor configured to:
   determine that an input that is used to perform a data processing task on behalf of a recruiter machine is not locally cached in a state that is consistent with a corresponding input stored in a file system at the recruiter machine, wherein cached input is cached in a dedicated file system associated with the recruiter machine at the volunteer machine, and wherein the dedicated file system comprises at least partially mirrored view of the recruiter machine's file system, and wherein the dedicated file system is mounted under a mount directory of a master file system at the volunteer machine, and wherein the recruiter machine distributed the data processing task to the system, and wherein the data processing task is associated with uncompiled code; and
   obtain the input from the recruiter machine in a state that is consistent with the corresponding input at the recruiter machine; and
a memory coupled to the processor and configured to provide instructions to the processor.

17. The system as recited in claim 16, wherein the processor is further configured to receive from the recruiter machine a request to perform the data processing task.

18. The system as recited in claim 16, wherein to determine that an input that is used to perform a data processing task on behalf of a recruiter machine is not locally cached in a state that is consistent with a corresponding input stored in a file system at the recruiter machine includes determining that one or more parameters associated with a version of the input as locally cached in the dedicated file system associated with the recruiter machine are not consistent with one or more corresponding parameters of the corresponding input as stored in a file system at the recruiter machine.

19. The system as recited in claim 16, wherein to determine that an input that is used to perform a data processing task on behalf of a recruiter machine is not locally cached in a state that is consistent with a corresponding input stored in a file system at the recruiter machine includes determining that a hash of a version of the input as locally cached in the dedicated file system associated with the recruiter machine is not consistent with a hash of the corresponding input as stored in a file system at the recruiter machine.

20. The system as recited in claim 16, wherein to determine that an input that is used to perform a data processing task on behalf of a recruiter machine is not locally cached in a state that is consistent with a corresponding input stored in a file system at the recruiter machine includes determining that the input does not locally exist in the dedicated file system associated with the recruiter machine.

21. The system as recited in claim 16, wherein to determine that an input that is used to perform a data processing task on behalf of a recruiter machine is not locally cached in a state that is consistent with a corresponding input stored in a file system at the recruiter machine includes determining that a version of the input locally cached in the dedicated file system associated with the recruiter machine is marked invalid.

22. A computer program product for performing a data processing task, the computer program product being embodied in a non-transitory computer readable storage medium and storing computer instructions for:
   determining at a volunteer machine that an input that is required used by the volunteer machine to perform a data processing task on behalf of a recruiter machine is not cached in a state that is consistent with a corresponding input stored in a file system at the recruiter machine, wherein cached input is cached in a dedicated file system associated with the recruiter machine at the volunteer machine, and wherein the dedicated file system comprises at least partially mirrored view of the recruiter machine's file system, and wherein the dedicated file system is mounted under a mount directory of a master file system at the volunteer machine, and wherein the recruiter machine distributed the data processing task to the volunteer machine, and the data processing task is associated with uncompiled code; and
   obtaining the input from the recruiter machine in a state that is consistent with the corresponding input at the recruiter machine.

23. The computer program product as recited in claim 22, wherein receiving at a recruiter machine an indication that an input that is used by a volunteer machine to perform a data processing task on behalf of the recruiter machine is not cached in a state that is consistent with a corresponding input stored in a file system at the recruiter machine comprises receiving a request for the input from the volunteer machine.

24. The computer program product as recited in claim 22, wherein receiving at a recruiter machine an indication that an input that is used by a volunteer machine to perform a data processing task on behalf of the recruiter machine is not cached in a state that is consistent with a corresponding input stored in a file system at the recruiter machine includes determining that one or more parameters associated with a version of the input as cached in the dedicated file system associated with the recruiter machine at the volunteer machine are not consistent with one or more corresponding parameters of the corresponding input as stored in a file system at the recruiter machine.

25. The computer program product as recited in claim 22, wherein receiving at a recruiter machine an indication that an input that is used by a volunteer machine to perform a data processing task on behalf of the recruiter machine is not cached in a state that is consistent with a corresponding input stored in a file system at the recruiter machine includes determining that a hash of a version of the input as cached in the dedicated file system associated with the recruiter machine at the volunteer machine is not consistent with a hash of the corresponding input as stored in a file system at the recruiter machine.

* * * * *

UNITED STATES PATENT AND TRADEMARK OFFICE
CERTIFICATE OF CORRECTION

| | | |
|---|---|---|
| PATENT NO. | : 8,286,127 B2 | Page 1 of 1 |
| APPLICATION NO. | : 12/841867 | |
| DATED | : October 9, 2012 | |
| INVENTOR(S) | : William M. Bumgarner, Adam C. Swift and Andrew Gross | |

It is certified that error appears in the above-identified patent and that said Letters Patent is hereby corrected as shown below:

Column 16, line 13, please delete "required" before 'used'.

Signed and Sealed this
Twenty-ninth Day of January, 2013

David J. Kappos
*Director of the United States Patent and Trademark Office*